United States Patent [19]

Camras

[11] 3,821,786

[45] June 28, 1974

[54] VIDEO TRANSDUCING APPARATUS

[75] Inventor: Marvin Camras, Glencoe, Ill.

[73] Assignee: ITT Research Institute, Chicago, Ill.

[22] Filed: Sept. 20, 1971

[21] Appl. No.: 182,212

Related U.S. Application Data

[60] Division of Ser. No. 34,504, May 4, 1970, Pat. No. 3,705,954, which is a division of Ser. No. 649,256, June 27, 1967, Pat. No. 3,596,008, which is a continuation-in-part of Ser. No. 528,934, Feb. 21, 1966, abandoned.

[52] U.S. Cl. .......... 358/4
[51] Int. Cl. .......... H04n 9/02
[58] Field of Search .......... 178/5.2, 5.4 R, 5.4 CD

[56] References Cited

UNITED STATES PATENTS 2,892,017 6/1959 Houghton .......... 178/5.4 CR
3,320,370 5/1967 Barry .......... 178/6.6 A

*Primary Examiner*—Richard Murray
*Attorney, Agent, or Firm*—Hill, Gross, Simpson, Van Santen, Steadman, Chiara & Simpson

[57] ABSTRACT

Monochrome and color television recording and playback circuitry for coupling of a video magnetic transducer head with a standard broadcast television receiver, the receiver having a matrixing circuit with X and Z inputs and R-Y, G-Y and B-Y outputs, and the head playback amplifier supplying R-Y and B-Y signals to the X and Z inputs of the matrixing circuit during reproduction of color television signals from the record medium.

7 Claims, 5 Drawing Figures

VIDEO TRANSDUCING APPARATUS

CROSS REFERENCES TO RELATED APPLICATIONS

The present application is a division of my copending application Ser. No. 34,504 filed May 4, 1970 (now U.S. Pat. No. 3,705,954, issued Dec. 12, 1972). Said application Ser. No. 34,504 is a division of Ser. No. 649,256 filed June 27, 1967 (now U.S. Pat. No. 3,596,008 issued July 27, 1971), and said application Ser. No. 649,256 is a continuation-in-part of application U.S. Ser. No. 528,934 filed Feb. 21, 1966 (now abandoned in favor of my application U.S. Ser. No. 62,601, filed Aug. 10, 1970 and issued as U.S. Pat. No. 3,683,107 on Aug. 8, 1972).

Reference is made in compliance with the requirement of 35 U.S.C. 120 to my earlier filed applications Ser. Nos. 528,934, 649,256 and 34,504.

BACKGROUND OF THE INVENTION

An important problem in the magnetic recording art relates to the need for a video transducer apparatus which can be manufactured at a reasonable cost and yet which will provide quality transducing of television signals, and particularly color television signals and the associated audio signals.

SUMMARY OF THE INVENTION

This invention relates to a wide band transducing system and method, and particularly to a system for recording and/or reproducing color television signals.

In a preferred embodiment of the present invention three demodulated color signals from a conventional color television receiver are transmitted by the circuitry of the present invention to a magnetic tape recorder.

The head units and circuit concepts of the present invention may be applied to various transducer configurations such as the right angle or skew angle rotating head configurations wherein the head units scan successive right angle or skew angle tracks on a longitudinally moving, relatively wide record tape. An important contribution of the present invention, however, resides in a system for transducing color television signals by means of stationary head units which scan longitudinal tracks on the record medium. For example, a system has been devised and usccessfully operated for recording and playing back broadcast color television signals on a 1/4 inch magnetic tape record medium with provision for more than one program on the same tape. Using the preferred head configuration, and preferred electric circuitry such color television signals may be recorded and reproduced with scanning speeds of the head relative to the record medium of the order of 120 inches per second or less and with the use of low cost tape transports, comparable in cost to present home (non-professional) type sound recorder transports. Head-to-tape scanning speeds of 60 inches per second or less are feasible using the teachings of the present invention, in contrast to head velocities of the order of 1,500 inches per second which are typical for present rotating head systems.

It is an object of the present invention to provide an economical color television transducing system such as would be particularly suitable for home or educational uses.

Still another object of the invention is to provide a system for recording and/or reproducing color television signals together with the related audio intelligence which is readily connected with present commercial broadcast receiver circuitry and which requires only three video transducer head units, or less.

Another and further object of the invention is to provide a system for recording and repoducing color television and audio signals with the use of broadcast receiver circuitry and a minimum number of additional low cost transistors of the order of 12.

Other objects, features and advantages of the present invention will be apparent from the following detailed description taken in connection with the accompanying drawings.

The objects of the aforementioned applications for patent are also applicable to the present disclosure and are specifically incorporated by reference at this point in the present specification.

It is also an object to provide simple means for phase error correction in video recording and/or playback circuitry.

A further object resides in the provision of a television recording and/or playback system with a high gain-low noise amplifier operable at relatively low tape speeds and with relatively narrow head widths.

Another object resides in a method and apparatus for high fidelity recording and/or reproduction at low cost.

A still further object is to provide a transducer system which is relatively insensitive to record speed variations.

Still another and further object of the invention resides in the provision of a relatively inexpensive and simple system for recording audio signals associated with a color video signal.

DESCRIPTION OF THE ILLUSTRATED EMBODIMENT

Figures 1, 2, 3:
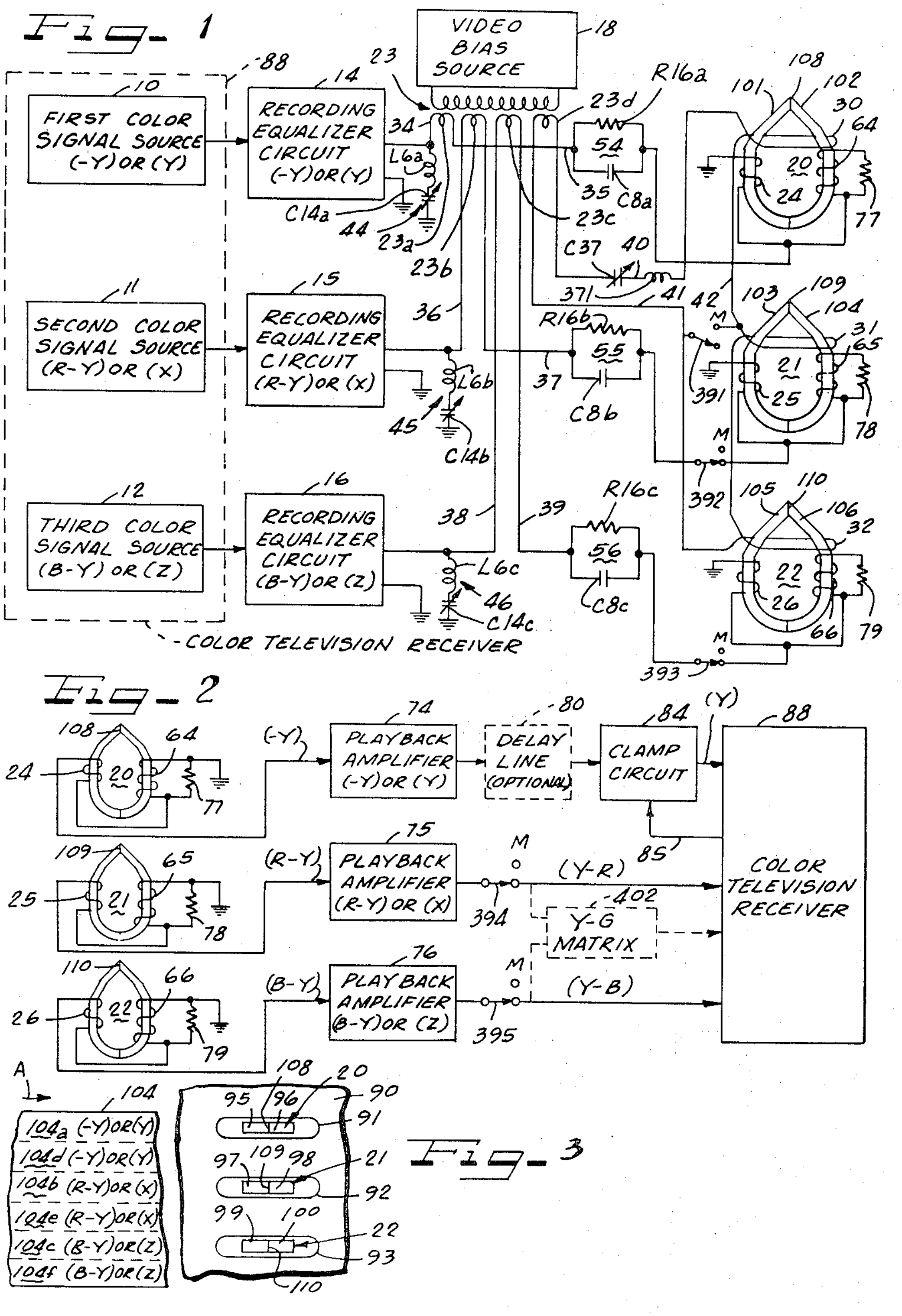
FIG. 1 is a diagrammatic view indicating a preferred color television recording system in accordance with the present invention.
FIG. 2 is a diagrammatic illustration of a preferred color television playback system in accordance with the present invention.
FIG. 3 is a diagrammatic partial plan view illustrating a preferred transducer system for recording and playback of color television signals.

FIG. 1 illustrates in diagrammatic form a preferred color television recording system in accordance with the present invention. In this preferred system, demodulated color signals are obtained from suitable sources such as indicated at 10, 11 and 12. In one type of commercial broadcast receiver, as for example the RCA CTC16XH chassis, demodulated signals known as the minus Y (—Y) signal, the R minus Y (R—Y) signal and the B minus Y (B—Y) signal may be obtained, respectively, from the plate of a third video amplifier tube, from the plate of a R minus Y amplifier tube and from the plate of a B minus Y amplifier tube. In general the (—Y) signal may be obtained from the cathode drive of commonly used three green color picture kinescopes, the (R—Y) signal from the red grid drive, and the (B—Y) signal from the blue grid drive. Alternatively the undelayed (—Y) signal is obtained from the first video amplifier. Alternatively, suitable demodulated color components known as the Y signal, the X signal and the Z signal may be obtained from the grids of the monochrome amplifier and color amplifier tubes respectively, and the color signal sources 10, 11 and 12 may represent suitable sources of these signals in such receiver circuitry, as another example. The term "color television signal" as utilized herein referes to a signal which may be utilized in reconstructing a color image without regard to whether the signal represents the actual variation of intensity of a particular color component of a light image. Thus, the term "color television signal" as utilized herein comprehends the conventional Y or (—Y) signal which is found in present receiver circuitry.

Recording circuitry components 14–16 may comprise suitable equalizer circuits and optionally may include amplification circuitry.

In the preferred circuit arrangement, a component 18 is included for supplying a high frequency bias current to the respective head units indicated at 20, 21 and 22. By way of specific example, the source 18 has been indicated as energizing a transformer 23 which has respective secondary windings 23*a*, 23*b* and 23*c* interposed in series between the respective recording circuits 14–16 and the respective record windings 24, 25 and 26 of the head units. The video bias source 18 is also illustrated as energizing cross field conductors 30, 31 and 32 in series by means of a secondary winding 23*d*.

In order to conveniently correlate the showing of FIG. 1 with the detailed circuit diagram of FIGS. 4*a* and 4*b*, conductors in FIGS. 4*a* and 4*b* corresponding to conductors 34–42 in FIG. 1 will be given corresponding reference numerals. To further facilitate a comparison of these figures, an adjustable capacitor C37 and bias frequency trapping circuits 44–46 have been indicated in FIG. 1 and have been given corresponding reference numerals in FIG. 4*a*. Similarly coupling circuits 54–56 have been indicated in FIG. 1 and the coupling circuit for the Y channel has been correspondingly designated in FIG. 4*a*. Thus, the details represented at 18, 23, 30–32, 43–46 and 54–56 are included in FIG. 1 solely for the purpose of correlation with the preferred system of FIGS. 4*a* and 4*b*, and these details are, of course, not necessary to the broad concepts of the present invention. Other modifications not falling within the scope of the embodiment illustrated in FIG. 1 will be described hereinafter.

FIG. 2 illustrates a preferred playback arrangement including head units 20–22 which are identical to the head units of FIG. 1. During playback, the low impedance windings 24–26 are connected in series with high impedance windings 64–66 to supply respective reproduced signals to playback amplifiers 74–76. Resistors 77–79 are connected in parallel with the high impedance windings 64–66 and are for the purpose of dampening any resonance effects in the high impedance coil associated therewith. The input impedance of components 74, 75, 76 are designed to further damp the resonances in heads 20, 21, and 22.

As indicated in FIG. 2, the reproduced signals may represent respective demodulated color signal components such as a (—Y) component, a R minus Y component and a B minus Y component or may represent Y, X and Z components as previously mentioned, for example. A delay line component 80 may be optionally provided in the Y channel, the delay line in the monochrome portion of the broadcast receiver being conveniently used. The three color component signals may be supplied to suitable points in a conventional color television receiver circuit, for example to the grid of a first video amplifier tube, to the grid of a R minus Y amplifier tube and to the grid of a B minus Y amplifier tube, respectively, where these are the signals normally present in such receiver circuitry. In the RCA CTC 24XH the delay line in the monochrome circuit may be bypassed by supplying the (—Y) playback signal to the third video amplifier V708, and similarly the delay line may be bypassed in other receivers.

Figure 4A:
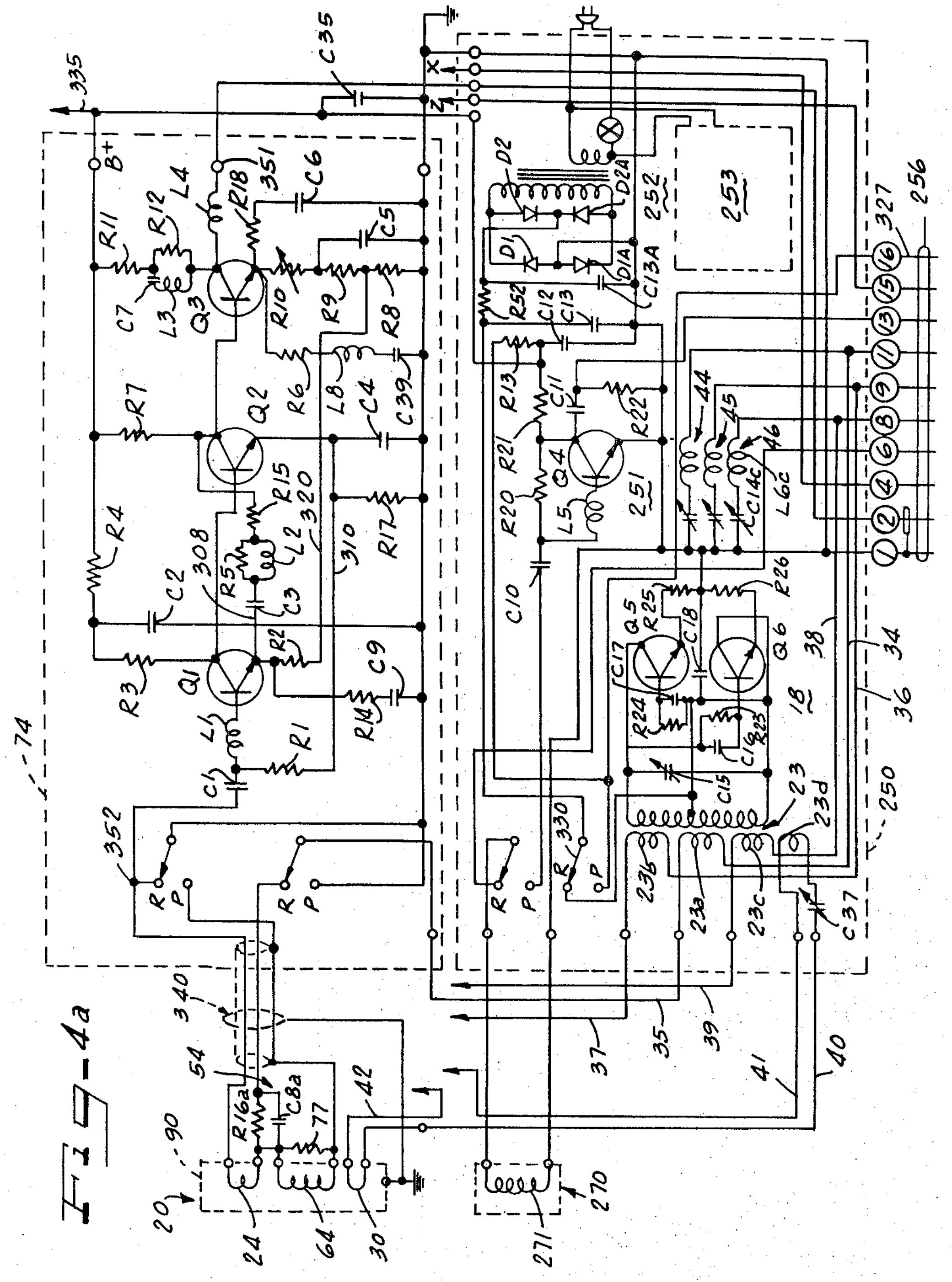
FIG. 4*a* is an electric circuit diagram showing portions of a preferred record-playback circuit in accordance with the present invention.
Figure 4B:
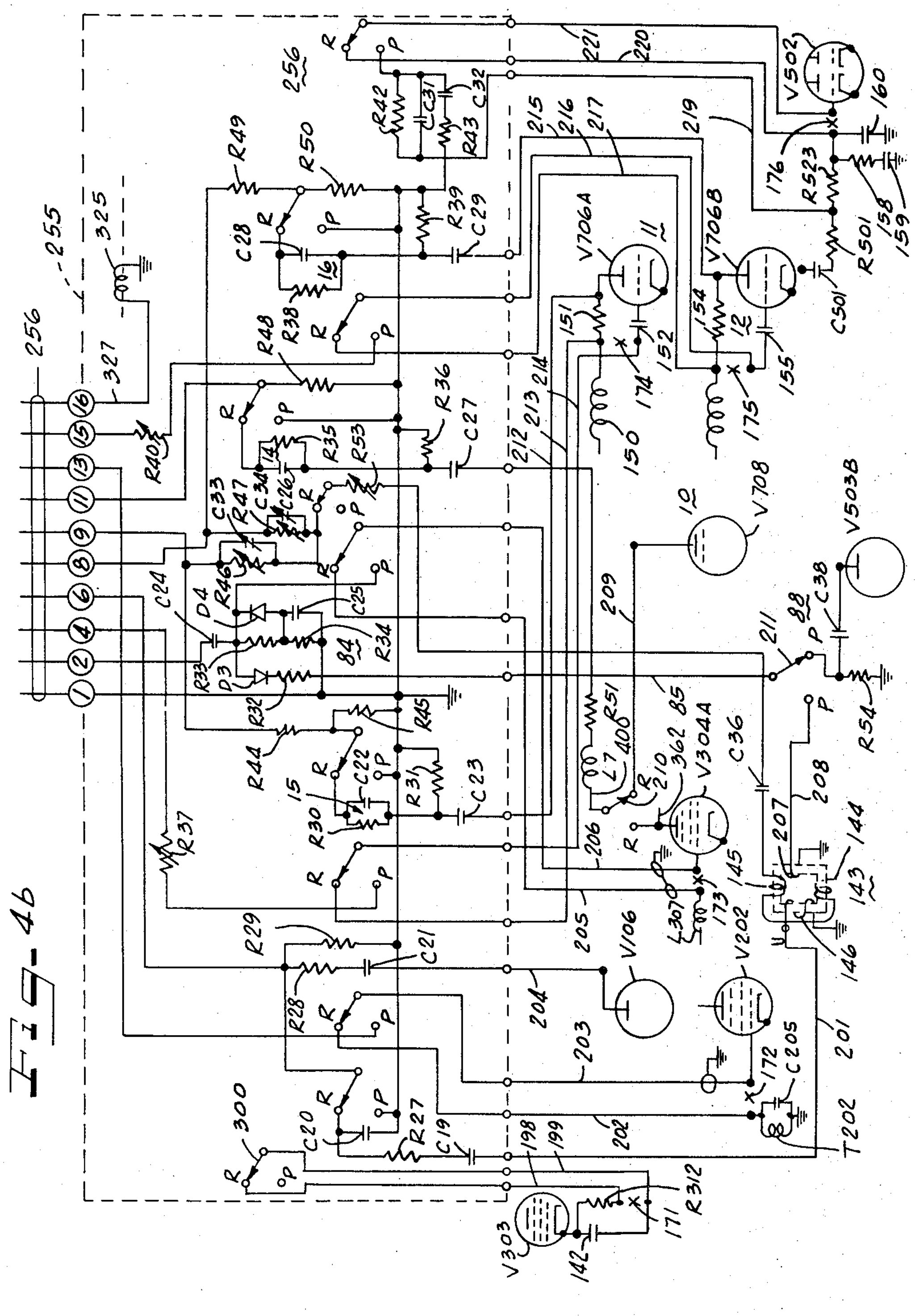
FIG. 4*b* is a circuit diagram showing further portions of a preferred record-playback circuit in accordance with the present invention, the circuitry of FIGS. 4*a* and 4*b* being connected by conductors of a cable indicated at the lower center of FIG. 4*a* and the top center of FIG. 4*b*.

For convenience in correlating FIG. 2 with the detailed circuitry of FIGS. 4*a* and 4*b*, a clamp circuit has been indicated at 84 in FIG. 2 and the specific clamp circuit shown in FIG. 4*b* has been designated by the same reference numeral. To conform with FIG. 4*b*, a pulse input to the clamp circuit 84 at the horizontal line frequency is represented as being supplied by a line 85 in FIG. 2 conforming with the showing for line 85 in FIG. 4*b*. The component designated by reference numeral 88 in FIG. 2 represents commercial broadcast receiver circuitry suitably modified so as to receive reproduced signals from the other components of the system of FIG. 2. Suitable modifications of one type of commercially available receiver using the RCA CTC16XH circuits have been indicated in detail in FIG. 4*b*. As with the embodiment of FIG. 1, the embodiment illustrated in FIG. 2 is not intended to comprehend all modifications falling within the scope of the concepts of the present invention, certain components having been indicated, such as the disclosure of particular preferred head units and a preferred clamp cicuit 84, for the purpose of facilitating disclosure of a preferred embodiment in conjunction with the detailed circuitry of FIGS. 4*a* and 4*b*. Modifications in the playback circuitry of FIG. 2 will generally correspond to modifications of the recording circuitry of FIG. 1. All such modifications of FIGS. 1 and 2 may be integrated into a combined recording and playback system, one preferred embodiment of which having been disclosed in FIGS. 4*a* and 4*b*. To illustrate this point, color component sources 10, 11 and 12 have been shown as contained within a dash rectangle 88 corresponding to the modified receiver circuitry 88 of FIG. 2. Broadly, however, the concepts of the present invention are not limited to the use or adaptation of conventional broadcast receiver circuitry, since any suitable source of color signal components may supply the signal to be recorded, and the reproduced color component signals may be supplied to any desired display or other utilization circuitry.

A preferred head configuration is illustrated in FIG. 3 taken in connection with the diagrammatic showings of FIGS. 1 and 2. A housing 90 of magnetic shielding material may substantially completely enclose the head units 20–22, the tape engaging surface 90*a* of the housing having three elongated openings 91, 92 and 93 for receiving the tape engaging pole faces 95–96, 97–98 and 99–100 (FIG. 3) of the respective head units 20, 21 and 22. The poles 101–102, 103–104 and 105–106 (FIG. 1) of the head units have transversely aligned transducing gaps 108–110 therebetween for coupling of the respective head units with a tape record medium such as indicated at 104.

DESCRIPTION OF THE SPECIFIC CIRCUITRY OF FIGS. 4*a* AND 4*b*

The general arrangement of the detailed circuitry of FIGS. 4*a* and 4*b* will be apparent from a comparison with FIGS. 1 and 2 since in FIGS. 4*a* and 4*b* reference numerals such as 10, 11, 12, 14, 15, 16, 18, 23, 24, 30, 34-46, 54, 64, 74, 77, 84, 85 and 88 have been located so as to indicate specific circuit elements corresponding to those represented in FIGS. 1 and 2.

For purposes of specific illustration, the components in the region 88 are in general conventional components of RCA Model CTC16XH color television chassis. This circuit is representative of color TV circuits that are widely used. The conventional networks and individual components shown in FIG. 4*b* are tabulated as follows: tube V303 (type 6EJ7), capacitor 142, resistor R312, inductor T202, capacitor C205, sound demodulator tube V202 (type 6HZ6), audio output tube V106 (type 6AQ5A), inductor L307, first video tube V304A (type 6LF8), horizontal output transformer 143, horizontal output winding sections 144, 145 and 146, tube V503B, third video tube V708 (type 12BY7A), inductor 150, resistor 151, capacitor 152, (R minus Y) amplifier tube V706A (type 6GU7), inductor 153, resistor 154, capacitor 155, (B minus Y) amplifier tube V706B (type 6GU7), capacitor C501, resistor R501, resistor R523, resistor 158, capacitor 159, capacitor 160, tube V502.

The following components within the general region of the receiver circuit 88 are new components having values as follows: inductor L7–500 microhenries, resistor R51–4,700 ohms, capacitor C36–1,000 micromicrofarads, resistor R54–47,000 ohms and capacitor C38–15 micromicrofarads.

The original circuit has been broken in a number of points as will be apparent to those skilled in the art, for example at the locations indicated by a small "*x*" and designated by reference numerals 171–176. At other places in FIG. 4*b*, tube elements, circuit components and conductive connections have simply been omitted for the sake of simplicity since such elements remain unchanged from the standard circuit.

Connections or additions to the standard RCA chassis comprise conductors 198 and 199, the conductor 201 connected to terminal U of the winding section 146 of the horizontal output transformer 143, conductors 202–206, a single turn winding 207 on the horizontal output transformer 143 together with a conductor 208 for coupling with conductor 85 and the clamp circuit 84 shown in FIG. 2, conductor 209 and switch 210 providing selective (minus Y) output from the plate of tube V304A or V708, inductor L7 and resistor R51, capacitor C36 connected to terminal No. 3 of winding section 145 of the horizontal output transformer, switch 211 providing in a left hand position coupling between conductor 208 and conductor 85 and in the illustrated right hand position connecting conductor 85 with the plate of tube V503B through capacitor C38 and conductors 212–221.

The top rectangle in FIG. 4*a* is designated by the reference numeral 74 since the circuit elements therein represent a preferred playback amplifier for the (minus Y) channel. The playback amplifier components 75 and 76 of FIG. 2 may utilize circuitry similar to that shown for component 74 in FIG. 4*a*.

The components in the lower dash line rectangle 250 in FIG. 4*a* include preferred circuitry for the video bias component 18 as well as the bias frequency trapping networks 44–46, an audio playback amplifier circuit 251 and a power supply circuit 252.

A tape transport control circuit is indicated by a dash rectangle 253 which may correspond to that shown in the seventeenth figure of my U.S. Pat. No. 3,531,600 issued Sept. 28, 1970. In an actual embodiment of the present invention, however, supply and take-up reel motors are used with special torque rotors to provide drag on the supply spindle depending on the direction of tape travel, instead of the half wave rectifier and variable resistor which provide direct current drag in my previous disclosure.

The circuitry in the dash line rectangle 255 in FIG. 4*b* may be termed the adaptor or coupling circuitry and consists of a junction box that receives a cable indicated at 256 from the recorder unit (represented by block 250 in FIG. 4*a*) and contains circuitry that is best located at the television receiver to minimize undesirable capacitance or stray coupling, and to simplify the cable connections. In other words, the adaptor circuit 255 is physically disposed closely adjacent to the conventional video circuit components indicated in the lower part of FIG. 4*b*.

The adaptor circuitry 255 includes preferred circuit elements for the equalizing circuits 14–16 of FIG. 1, and these circuits have been designated by the corresponding reference numerals to indicate this fact. Also included is preferred circuitry for the clamp circuit 84 of FIG. 2 and accordingly the reference numeral 84 has been applied in FIG. 4b. A stabilizing circuit 256 is indicated at the lower right of the box 255 and is associated with the horizontal control circuit of the receiver circuitry including elements C501, R501, R523 and 158–160.

A single channel audio transducer head is diagrammatically indicated at 270 in FIG. 4*a* and is shown as including a winding 271. This audio head unit may correspond to that illustrated in the fifth figure of my U.S. Pat. No. 3,502,795, issued Mar. 24, 1970.

The operation of the video head units such as indicated at 20 in FIG. 4*a* in relation to the other circuitry of FIG. 4*a* will be readily understood by a consideration of the disclosure of my U.S. Pat. No. 3,531,600.

The overall function and operation of the circuitry of FIGS. 4*a* and 4*b* will in general be apparent from the foregoing description and from the disclosures of my aforementioned U.S. Pat. Nos. 3,531,600 and 3,502,795, and is described in my U.S. Pat. No. 3,683,107.

The circuitry of FIGS. 4*a* and 4*b* is converted from the recording mode illustrated to the playback mode by shifting the record-play selector switches from the "R" to the "P" positions.

It will be understood that during playback of a recorded video signal, the reproduced signal will be supplied to the grid of amplifier tube V304A, and that the plate of the tube V304A is coupled by means of a connection such as indicated at 362 to succeeding stages of video amplification via existing circuits. The color television receiver 88 of course includes an image reproducing device such as a tri-color television tube.

The preferred circuit values of a successfully operating system in accordance with the present invention are given in the following tabulation:

EXEMPLARY CIRCUIT VALUES

Video Head Circuits, FIG. 4*a*

| | |
|---|---|
| Windings **24, 25, 26** | each 200 turns |
| Windings **64, 65, 66** | each 1,200 turns |
| Resistors **77, 78, 79** | each 8,200 ohms |
| R16*a*, R16*b*, R16*c* | each 10,000 ohms |
| C8*a*, C8*b*, C8*c* | each 100 micromicrofarads |

Video Playback Amplifier 74, FIG. 4*a*

| | | | |
|---|---|---|---|
| R1 | 39,000 ohms | C1 | 25 microfarads (electrolytic |
| R2 | 150 ohms | C2 | 15 microfarads (electrolytic) |
| R3 | 33,000 ohms | C3 | 0.01 microfarad (10,000 micromicrofarads) |
| R4 | 5,600 ohms | C4 | 60 microfarads (electrolytic) |
| R5 | 10.000 ohms | C5 | 250 microfarads (electrolytic) |
| R6 | 56 ohms | | |
| R7 | 3,300 ohms | C6 | 0.005 microfarad (5,000 micromicrofarads) |
| R8 | 5.6 ohms | C7 | 0.1 microfarad |
| R9 | 150 ohms | C9 | 0.0005 microfarads (500 micromicrofarads) |
| R10 | 22 ohms (adjustable) | C39 | 0.03 microfarad |
| R11 | 470 ohms | L1 | 10 microhenries |
| R12 | 470 ohms | L2 | 240 microhenries |
| R14 | 22 ohms | L3 | 50 microhenries |
| R15 | 3,300 ohms | L4 | 50 microhenries |
| | | L8 | 240 microhenries |
| R17 | 180 ohms | Q1 | 16L64 (Manufactured by General Electric Co. of U.S.A.) |
| R18 | 33 ohms | Q2 | 16L64 (Manufactured by General Electric Co. of U.S.A.) |
| | | Q3 | 16L64 (Manufactured by General Electric Co. of U.S.A.) |

The terminal B+ receives a direct current voltage relative to ground of 18 volts.

Resistor R19 has been replaced by a short circuit in amplifier 74. Resistor R19 is indicated in FIG. 4*a* so as to show its location in amplifiers 75 and 76.

VIDEO PLAYBACK AMPLIFIERS 75 AND 76, FIG. 2

The circuit arrangement and circuit values for amplifiers 75 and 76 are the same as for amplifier 74 except that: (1) capacitor C9 and resistor R14 are eliminated in amplifiers 75 and 76; (2) inductor L2 and resistor R5 are replaced by a short circuit in amplifiers 75 and 76; and (3) elements R6, L8 and C39 are omitted in amplifiers 75 and 76. In amplifiers 75 and 76 there is an open circuit in place of the circuit comprising resistor R14 and capacitor C9 of amplifier 74, and in place of the circuit comprising R6, L8 and C39.

Audio Playback Amplifier 251, FIG. 4*a*

| | |
|---|---|
| R20 | 1.5 megohms |
| R21 | 100,000 ohms |
| R22 | 220,000 ohms |

| | |
|---|---|
| C10 | 20 microfarads (electrolytic) |
| C11 | 0.01 microfarad |
| L5 | 10 microhenries |
| Q4 | 2N3391A Transistor Type |

Power Supply 252, FIG. 4*a*

| | |
|---|---|
| R13 | 680 ohms |
| C12 | 500 microfarads (electrolytic) |
| C13 | 500 microfarads (electrolytic) |
| C13A | 500 microfarads (elecrolytic) |
| R52 | 10 ohms |
| D1=1N1692 | |
| D2=1N1692 | |
| D1A=1N1692 | |
| D2A=1N1692 | |

Video Bias Oscillator 18, FIG. 4*a*

Frequency 3.6, 4.2, or 4.7 + megacycles per second

| | |
|---|---|
| R23 | 6800 ohms |
| R24 | 6800 ohms |
| R25 | 5.6 ohms |
| R26 | 5.6 ohms |
| C15 (adjustable) | 200 micromicrofarads to 2000 micromicrofarads |
| C16 | 300 micromicrofarads |
| C17 | 300 micromicrofarads |
| C18 | 0.05 microfarads (50,000 micromicrofarads) |
| Q5 | 7A30 manufactured by General Electric Co., U.S.A |
| Q6 | 7A30 manufactured by General Electric Co., USA |

Video Bias Circuits, FIGS. 1 & 4*a*

| | |
|---|---|
| C14*a* (adjustable) | 8 micromicrofarads to 80 micromicrofarads |
| C14*b* (adjustable) | 8 micromicrofarads to 80 micromicrofarads |
| C14*c* (adjustable) | 8 micromicrofarads to 80 micromicrofarads |
| L6*a* | 100 microhenries |
| L6*b* | 100 microhenries |
| L6*c* | 100 microhenries |

Adaptor Circuit 255, FIG. 4*b*

| | | | |
|---|---|---|---|
| R27 | 12,000 ohms | C19 | 0.006 microfarad (6,000 micromicrofarads) |
| R28 | 83,000 ohms | | |
| R29 | 100,000 ohms | C20 | 0.005 microfarad (5,000 micromicrofarads) |
| R30 | 47,000 ohms | | |
| R31 | 470,000 ohms | C21 | 0.05 microfarad (50,000 micromicrofarads) |
| R32 | 470,000 ohms | | |
| R33 | 680,000 ohms | C22 | 200 micromicrofarads |
| R34 | 470,000 ohms | C23 | 0.25 microfarad |
| R35 | 47,000 ohms | C24 | 0.002 microfarad (2,000 micromicrofarads) |
| R36 | 470,000 ohms | | |
| R37 | 8,200 ohms (adjustable) | C25 | 0.05 microfarad (50,000 micromicrofarads) |
| R38 | 47,000 ohms | | |
| R39 | 470,000 ohms | C26 | 200 micromicrofarads |
| R40 | 10,000 ohms (adjustable) | C27 | 0.25 microfarad |
| | | C28 | 200 micromicrofarads |
| | | C29 | 0.25 micromicrofarads |
| R42 | 000,000 ohms | C31 | 200 micromicrofarads |
| R43 | 100,000 ohms | C32 | 470 micromicrofarads |
| R44 | 5,600 ohms | | |
| R45 | 10,000 ohms | | |
| R46 | 500,000 ohms (adjustable) | | |
| R47 | 500,000 ohms (adjustable) | C33 | 8 micromicrofarads (adjustable) |
| R48 | 10,000 ohms | C34 | 8 micromicrofarads (adjustable) |
| R49 | 5,600 ohms | | |

| | |
|---|---|
| R50 | 10,000 ohms |
| R53 | 120,000 ohms (adjustable) |
| D3 | 1N463A |
| D4 | 1N463A |

Television Receiver Circuitry, FIG. 4*b* (added components)

| | | | |
|---|---|---|---|
| R51 | 4700 ohms | C36 | 1000 micromicrofarads |
| R54 | 47,000 ohms | C38 | 8.2 micromicrofarads |
| L7 | 500 microhenries | | |

The components R51, R54, L7, C36 and C38, and particularly resistor R54 and capacitor C38 may be physically located on the chassis of adaptor circuit 255. If components R54 and C38 were in the adaptor, switch 211 could be placed in the adaptor also, or conductor 85 could be permanenly connected to the plate of tube V503B, and switch 211 omitted.

An improvement in vertical synchronizing has been obtained by increasing the value of the conventional component R504 from 200,000 ohms to 1.5 megohms.

Capacitor C37, FIGS. 1 and 4*a*, is adjustable from 100 micromicrofarads to 1,000 micromicrofarads; a typical setting is approximately 500 micromicrofarads, where the oscillator frequency is 4.2 megacycles per second.

Capacitor C35 byapasses high frequencies and is associated with the B+ lead 335 energizing each of the playback amplifiers 74, 75 and 76; its value may be .05 microfarad.

The resistor R17 and the corresponding resistors in playback amplifiers 75 and 76 may be of adjustable value and may be adjusted to set the direct current operating bias of the amplifiers 74–76.

The cable 256 may have a plug for fitting into a socket on the chassis of adaptor circuit 255.

Referring to the block diagram of FIGS. 1 and 2, in order to record the X and Z signals, suitable amplifier stages would have their respective inputs connected to be output of the X and Z demodulators, or to the grid circuits of tubes V706A, and V706B of the rèceiver circuitry shown in FIG. 4b. The outputs of such amplifier stages would then be connected to this recording equalizer circuits 15 and 16, respectively. Thus, in the case, the television reciever circuitry together with the amplifier stages would constitute the signal sources 11 and 12. Referring to FIG. 4b, the plates of the amplifier stages (whose grids are connected to the grids of tubes V706A and V706B) would be connected to conductors 212 and 215 in FIG. 4*b*, and the connection of the plates of tube V706B, and V706B with conductors 212 and 215 would be omitted. Similarly the (−Y) signal can be supplied by an amplifier stage whose input is connected to the grid of V304*a* or V708, and whose output is connected to 400 with switch 210 open.

The added video amplifier stages for the X and Z signals would not mix the signals, as acutally occurs in the cathode circuits of tubes V706A, and V706B. Each such amplifier stage may conveniently be provided by one-half of a single type 6GU7 double triode, with the B+ and filament power therefor supplied from the television receiver 88. The cathodes of such triode sections would be maintained at alternating current ground potential as by means of a large by-pass capacitor. For playback of the recorded X and Z signals, the outputs of the playback preamplifiers 75 and 76 would be applied to the grid circuits of tubes V706A and V706B, respectively, as indicated for example in FIG. 4b.

Referring to FIG. 1, if the (−Y), (R−Y) and (B−Y) signals are to be recorded, the sources 10–12 may include the television circuitry of FIGS. 4*b*, and the output from components 10–12 in FIG. 1 may be provided by the plate circuits of tubes V304A, V706A and V706B in FIG. 4*b*. Alternatively, to prevent loading of the television set circuits and for better matching to the recording circuits, separate amplifier stages or cathode follower stages may be used for the color channels, with their inputs connected to the plate circuits of tubes B706A and V706B, respectively, and their outputs connected to conductors 212 and 215; or with their inputs connected to other suitable R−Y and B−Y sources such as appropriate demodulator stages of a broadcast television receiver. When recordings have been made utilizing R−Y and B−Y sources, the playback signals from amplifier components 75 and 76 in FIG. 2 may (1) be matrixed at circuit 402 to give a G−Y signal if the color television set does not have this type of matrixing; or (2) the television receiver circuits may be modified for such matrixing during tape playback if the circuits do not normally provide the correct type of matrixing. By way of example, a G−Y signal may be derived from R−Y and B−Y signals by mixing 0.51 parts of the R−Y signal with 0.19 parts of the B−Y signal, and reversing the phase of the resultant signal. The matrixing component 402 shown external to receiver 88 performs the foregoing mixing and phase inverting function where the receiver circuit lacks such a circuit or a suitable substitute. Other types of matrixing circuits for deriving a G−Y signal are known in the art.

It has been found however that unmodified X and Z matrixing of the reproduced Y−R and Y−B signals as indicated in FIGS. 4*a* and 4*b* gives excellent results, particularly when color controls corresponding to the variable resistor R10 in amplifier component 74, FIG. 4*a*, are used. The arrangement shown in detail in FIGS. 4*a* and 4*b* is simple and economical since it requires no power amplifiers other than those already in the commercial color television receiver. Excellent color rendition is obtained especially of orange-pink skin tones which are ordinarily difficult to reproduce even on direct broadcast reception.

In the specific circuit illustrated in FIGS. 4*a* and 4*b*, the principal color controls are variable resistors in the emitter circuits of the third transistor stage of the playback preamplifiers 75 and 76, the variable resistors corresponding to the variable resistor R10 of the playback circuit 74. These two principal color controls are preferably ganged on concentric shafts which are frictionally engaged with each other so that the gains of the color amplifiers 75 and 76 increase or decrease together as the knob assembly is turned; yet either of the concentric knobs may be turned individually by holding the other one back. These two controls are sufficient to change the picture from normal coloring to exaggerated color intensity, or to a light tint, or even to a monochrome rendition, according to taste. Alternatively, only the amplifier 75 may be provided with a variable resistor having a manual control know on the user's external panel, the resistor corresponding to R10 of the amplifier 76 either having a preset value or being a fixed resistor of desired value.

It will be apparent that many modifications and variations may be effected without departing from the scope of the novel concepts of the present invention.

I claim as my invention:

1. In combination with a broadcast color television receiver, a transducer head for coupling to a magnetic record medium having color television signals recorded thereon corresponding to a color image, and playback means connected to said head and to said receiver for receiving reproduced color television signals from the head and for supplying color difference signals to the receiver for use in reconstructing said color image, said receiver having a matrixing circuit with X and Z inputs and R—Y, G—Y and B—Y outputs, and designed to receive X and Z input signals and to supply R—Y, G—Y and B—Y output signals, and said playback means supplying R—Y and B—Y signals to the X and Z inputs of said matrixing circuit during reproduction of the color television signals recorded on the record medium.

2. The combination of claim 1 with said playback means comprising a pair of color signal amplifiers for amplifying R—Y and B—Y signals from the head, at least one of said color amplifiers having a negative feedback circuit, and having adjustable impedance means controlling the amplitude level of the feedback signal.

3. The combination of claim 1 with said playback means comprising an amplifier having a negative feedback circuit with capacitance means bypassing the feedback circuit, and adjustable impedance means controlling the amplitude of the signal supplied to the feedback circuit and to the capacitance means in parallel.

4. The combination of claim 1 with said playback means cmprising a pair of color signal amplifiers for amplifying the reproduced R—Y and B—Y signals from the transducer head, at least one of the color signal amplifiers having a negative feedback circuit with a variable resistor controlling the amplitude of the feedback signal, said resistor being variable over a range of resistance values corresponding to gains with respect to the frequency range from 10 kilohertz to 300 kilohertz of at least about 10 to one.

5. Transducer apparatus for transducing color television signals which comprises source means for providing respective color television signals representing a color image including a luminance signal, and X signal and a Z signal, a magnetic transducer head for coupling to a magnetic record medium, and coupling means connected to said source means for supplying said luminance signal, said X signal and said Y signal to said head for recording on the magnetic record medium.

6. The apparatus of claim 5 with said source comprising a broadcast color television receiver having demodulator circuits for supplying at the outputs thereof said X and Z signals, respectively, and said transducer head having respective individual head units for connection by said coupling means to the outputs of the respective demodulator circuits.

7. Transducer apparatus according to claim 5 with said transducer head being operative to scan a magnetic record medium to electrically reproduce recorded X and Z signals, and matrix means connected to said head for receiving the reproduced X and Z signals and for deriving R—Y, B—Y and G—Y signals.

* * * * *